Patented Jan. 13, 1931

1,788,706

UNITED STATES PATENT OFFICE

ROY CROSS, OF KANSAS CITY, MISSOURI, ASSIGNOR TO SILICA PRODUCTS CO., OF LOS ANGELES, CALIFORNIA, A CORPORATION OF DELAWARE

EMULSION COMPOSITION

No Drawing.    Application filed April 9, 1928. Serial No. 268,800.

The invention relates particularly to the behavior of natural and artificial hydrous silicates of alumina which have the property of normal swelling to a greater or lesser degree in the presence of water. Natural silicates of this type have been found which are capable of forming a fairly stiff gel with from two to twenty parts of water though the product of the best commercial deposits representing the average material is practically never found which will form a gel when more than ten parts of water are used. However, when these inorganic swelling clays or hydrous silicates are mixed with a small amount of an alkali earth silicate it has the property of forming a gel in many cases with five times as much water as is the case before the alkali earth silicate is added. An alkali silicate improves the gelling properties but the greatest effect seems to be obtained from alkali earth silicates; also similar improvement is obtained by the action of alkaline substances of any kind such as lime (calcium oxide or hydroxide), alkali prosphate, carbonate, etc. Typical commercial alkali earth silicates include any type of Portland cement, some types of natural cement, blast furnace slag and combinations of lime and sodium silicate. The most desirable gel strengthener on account of its other properties, its commercial availability and cheapness, is ordinary Portland cement. The amount of Portland cement required is dependent upon the stiffness of the gel desired. Much improvement in the gelling properties is obtained with as little as five per cent of Portland cement based upon the hydrous silicate of alumina used. A desirable quantity is about twenty per cent for many purposes. In those cases in which the property of the cement enters into the composition, any amount of cement may be used. In many cases, a mixture of equal parts of cement and the swelling clay is satisfactory.

One of the important features of this invention is dependent upon the fact that when this alkali earth silicate of alumina such as Portland cement is used in conjunction with the swelling clay, the reversibility of the swelling action is overcome. For example, if ordinary bentonite, which swells upon the addition of water, is dried and water again added, the bentonite will again swell. However, if Portland cement is added in the proportion of twenty pounds of Portland cement to eighty pounds of bentonite, the gelling power of the bentonite is increased from two to ten fold. When this hydrated mixture is now dried and water again added to it, it has almost completely lost its gelling power or its ability to take on water so that the combination may then be said to be irreversible. This property makes this invention particularly useful because of the increase in waterproofing properties by reason of the decreased ability to swell or take on water after having once swelled and dried. In the use of this invention, it is desirable to provide for a dried substance which can be transported without being previously mixed with water. This dried substance when ready for use is capable of being mixed with water to form plastics or emulsions of the consistency desired.

Among the uses to which this material may be put therefore are (1) the manufacture of cheap paints. For such purposes, a typical mix would be approximately as follows: natural hydrated silicate, gelatinizing clay or bentonite such as is found near Death Valley, California, or in the Black Hills district in Wyoming, may be used as the basic material. White Portland cement is intimately mixed with it. Heavy hydrocarbon oil or linseed oil may be added. When the material is ready to use, it is thoroughly mixed with water forming a thick emulsion which may be applied as a paint. A typical mix would be as follows:

| | Parts |
|---|---|
| White gelatinizing clay | 25 |
| White Portland cement | 25 |
| White zinc oxide | 25 |
| Heavy hydrocarbon oil or drying oil | 50 |

This material may be packed and stored indefinitely in containers and when ready to use is mixed with a sufficient amount of water to give a workable consistency. In a typical instance, this would depend upon the character of the cement and upon the character of the gelatinizing clay. Five hundred parts of water more or less, is added to give the proper working consistency and this is then applied to the surface by means of a spray or brush. The action of the white Portland cement which is preferably of the quickly hardening variety is to increase the gelatinizing property of the gelatinizing clay. For example, in a typical instance, the addition of from five per cent to one hundred per cent of Portland cement to gelatinizing clay or bentonite approximately quadruples its gelatinizing power. Furthermore, it has the property of making the gelatinizing action of the clay irreversible so that after the water has formed the gel, and the gel has dried out, it becomes much less susceptible to the further action of water. This also is accomplished to some degree by the hydration of the cement. For this reason, the quickly hardening cement is desirable so that the water of combination fully reacts before drying is completely effected.

The composition may be made consisting of the gelatinizing clay and the calcium silicate or cement alone, or it may be made of the gelatinizing clay, the cement and the oil. In the first case, the oil may be added or the water for making the plastic may be added without the oil. In the second case, the water only need be added. In cases where the white color is not necessary, gelatinizing clays that are not perfectly white may be used. Also ordinary Portland cement or blast furnace slag may be used and a dark colored oil or asphalt may be satisfactory in those cases where dark or black coating is to be made. It is desirable that all materials except the oil, be ground to a high degree of fineness as is customary in paint manufacture.

(2) For surface waterproofing of all types of construction materials such as concrete, steel, pipe lines, gypsum plaster products, timber and the like. A typical method would include the application of the emulsion, bentonite, Portland cement, asphalt and water for the manufacture of a coating on freshly laid concrete roads to prevent evaporation of moisture and to provide a surface which would protect the concrete and prevent excessive wearing, particularly in its earlier periods of hydration. A typical mixture for this purpose would be as follows:

| | Pounds |
|---|---|
| Bentonite | 25 |
| Ordinary Portland cement | 5 |
| High penetration asphalt cement | 25 |
| Water—250 to 500 lbs. depending upon the consistency desired and the amount to be applied per square yard. | |

Approximately the same composition may be used for applying to roads of all kinds, including clay roads, this material taking the place of ordinary road oil. It has the advantage over ordinary road oil in that the asphalt used may be of a harder character than ordinary, the thinning being accomplished with water instead of with light oil or naphtha.

(3) In the manufacture of roofing compositions containing fibrous material. This composition provides a very much more gelatinous inorganic material for making such emulsions than is possible by any other known means. In such cases, just sufficient Portland cement or other silicates or aluminate is used to greatly increase the gelatinizing value of the natural hydrous silicate. When bentonite alone is used for this purpose, ordinarily the hydration is reversible. That is, after having been treated with water and dried it will again take up water. By the use of Portland cement in the composition, the bentonite will hydrate but once, so that the product after drying becomes resistant to the action of water. By the use of a large amount of fibrous material and a large amount of water, this composition forms a basic material for insulation and as roofing, serves not only as insulation against heat but also for water-proofing. The same composition may be used for other insulating purposes as in refrigeration.

(4) This composition also may be used for mixing with mineral aggregate in the laying of cold asphalt pavement. In this case, only enough Portland cement need be used to make the hydration of bentonite or gelatinizing clay irreversible. The composition of gelatinizing clay, Portland cement and asphalt may be made also to include mineral aggregate and this then is mixed with water to facilitate the proper placing and to prevent the mix from packing before it is ready for spreading. A typical mix would be as follows:

| | |
|---|---|
| Bentonite | 50 lbs. |
| Asphaltic cement | 100 lbs. |
| Portland cement | 50 lbs. |
| Mineral aggregate | 800 lbs. |
| Water | 100 gallons |

(5) Compositions also may be used for the integral waterproofing of all types of concrete and for giving plasticity to concrete mixes, and for preserving steel against corrosion which the concrete may be used to incase. For all of the varieties of purposes for which this composition may be used, it is important to very intimately incorporate all the materials. In some cases, it would be necessary to heat the mineral materials so that the bituminous material may be added. When, however, the bituminous or oily material is not semi-solid, solid or highly viscous, the mixing may be done cold.

I claim as my invention:

1. A composition of matter comprising a major proportion of gelatinizing clay and a minor proportion of calcium silicate in finely divided form adapted to form a gel with water.

2. A composition of matter comprising a major proportion of gelatinizing clay and a minor proportion of Portland cement adapted to form an irreversible gel with water.

3. A composition of matter comprising a major proportion of gelatinizing clay, a minor proportion of calcium silicate in finely divided form and oil and adapted to form a suspension with water.

4. A composition of matter comprising a major proportion of gelatinizing clay, a minor proportion of Portland cement and bitumen and adapted to form an emulsion with water.

5. A composition of matter comprising a major proportion of gelatinizing clay, a minor proportion of white Portland cement and oil and adapted to form an irreversible emulsion with water.

6. A composition of matter comprising a major proportion of hydrated alumina silicate and a minor proportion of Portland cement and adapted to form a gel with water.

7. A composition of matter comprising a major proportion of hydrated alumina silicate, a minor proportion of calcium silicate in finely divided form and hydrocarbon and adapted to form an emulsion with water.

8. A composition of matter comprising bentonite and a small amount of alkali earth silicate adapted to form a gel with water.

9. A composition of matter comprising bentonite to which has been added approximately five per cent of Portland cement.

10. A composition of matter containing bentonite, Portland cement in a proportion less than the bentonite, asphaltic cement, and mineral aggregate adapted to form a plastic mass with water and capable of hardening to a waterproof mass on drying.

ROY CROSS.